UNITED STATES PATENT OFFICE 2,337,220

CONDENSATION PRODUCTS AND PROCESS OF PREPARING SAME

Otto Albrecht, Neue Welt, near Basel, and Richard Sallmann, Bottmingen, Switzerland, assignors to Society of Chemical Industry in Basle, Basel, Switzerland, a firm No Drawing. Application August 1, 1939, Serial No. 287,850. In Switzerland August 11, 1938

15 Claims. (Cl. 260—401)

This invention relates to the manufacture of new condensation products by causing a mercaptan or a salt thereof to react with formaldehyde derivatives of such carboxylic acid amides in which the nitrogen atom of the amide group is united with at least one hydrogen atom. Formaldehyde derivatives of carboxylic acid amides include N-methylolamides and functional derivatives thereof, for example the N-halogen-methylamides. The condensation components may contain water-solubilizing groups or substituents capable of conversion into such groups. The transformation into the water-solubilizing groups may occur during or after the production of the condensation product.

Any mercaptans can be used in the invention and they may contain substituents for example ethyl-, oxyethyl-, glycerine-, octyl-, dodecyl-, hexadecyl-, octadecylmercaptan, thioglycollic acid, β-mercapto-ethane sulfonic acid. Moreover the mercaptan may contain an hydroxy-, carboxylic acid- or sulfonic acid-group or a quaternary ammonium group. Carboxyl groups and sulfo groups which may exist in the mercaptans can also be designated as salt-forming groups.

As methylolamides the amide group of which is linked to a carbonyl group, there may be named condensation products from formaldehyde and an organic compound which contains an

group in amide-like or imide-like union and indeed as member of an open chain or of a ring. Compounds which contain an

group in amide-like union are for examples amides and urethanes which may be substituted in any desired manner, but must contain at least one free hydrogen atom at the nitrogen atom of the carboxy amide group; the following are examples: aliphatic, aromatic, aliphatic-aromatic, cycloaliphatic and heterocyclic amides of for instance the following acids, acetic, propionic, acrylic, butyric, caprylic, capric, undecylic, lauric, myristic, palmitic, stearic, oleic, benzoic, naphthoic, hexahydrobenzoic, resinic, naphthenic, chloracetic, chloromethylbenzoic, chloropropionic and salicylic, as well as the corresponding N-substitution products which must comprise at least one hydrogen atom united with the nitrogen atom, for instance N-methyl- or N-ethyllauric acid amide. Other suitable amides are urea, thiourea and melamine, as well as their substitution products, for instance monomethylurea, palmitoyl-thiourea. As urethanes may be named for instance those which are substituted at the oxygen atom by methyl, ethyl, octyl, dodecyl, benzyl or cyclohexyl. The formaldehyde which has been used in making methylolamides may be used in the form of an aqueous solution or in the form of a polymeric modification, for instance paraformaldehyde. The compounds containing the methylolamides which are to be used in the invention are either known (methylolurea, N:N-dimethyl-methylolurea, methylolchloracetamide, stearic acid methylolamide, salicylic acid methylolamide, or the like) or may be made without further direction by analogous methods, for instance by dissolving the amide-like or imide-like compound in a solvent such as water, alcohol, acetone, glacial acetic acid, benzene or pyridine or a mixture of any of these and causing the solution to react at ordinary or moderately raised temperature, for example 50–100° C. with formaldehyde, if desired in the presence of a basic or acid catalyst such as trimethylamine, potassium carbonate, barium hydroxide, hydrogen chloride, sulfuric acid or a salt such as zinc chloride.

As functional derivatives of methylolamides there come into question products in which the OH-group of the methylolamide group has been exchanged for halogen. Such functional derivatives, for example those containing a

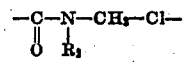

group in which R₂ is for example an aliphatic hydrocarbon residue are either known or obtainable by analogous methods without further direction.

As water-solubilizing groups the methylolamides to be used as parent material may contain a sulfonic acid group, a thiousulfuric acid group, a sulfuric acid ester group or a carboxylic acid group in free or neutralized form or furthermore a quaternary ammonium group, for example the methylol compound of sulfoacetamide or of phthalamide acid or of a carboxylic acid amide, which contains a quaternary ammonium group, for instance the addition product of a tertiary amine like trimethylamine, pyridine, methylpiperidine, hexamethylenetetramine to the N-methylol derivative of the aforesaid halogen carboxylic acid amide may be used. Also hydroxyl groups, for instance in the form of glycerine or poly-glycerine residues and poly-glycol residues may be contained in the said parent material as the water-solubilizing groups.

The reaction between the methylolamides or the functional derivatives thereof with the mercaptan may be carried out by mixing the components at room temperature or at higher temperature preferably in presence of a solvent, for instance water, methanol, ethyl alcohol, dioxane, acetone, glacial acetic acid, benzene, toluene, pyridine and if desired in the presence of an acid catalyst, for instance hydrochloric acid or sulfuric acid.

A reactive substituent which may be present in a condensation component (methylolamide or a functional derivative thereof and mercaptan) and may pass into the final product, for example a halogen atom, may be converted by known methods into a water-solubilizing group, for example, a tertiary amine may be attached at the halogen atom with formation of a quaternary ammonium salt, for example in presence of a solvent such as petroleum ether.

This addition frequently occurs on standing at room temperature. Moreover the halogen atom may be caused to react with sodium thiosulfate, for instance in presence of a solvent such as water, methanol, ethyl alcohol, acetone or a mixture of any of these. Hydroxy-groups which may be present in the condensation product may be converted into sulfuric acid ester groups by means of the addition product of sulfur trioxide to pyridine, if desired in presence of a solvent, for instance a halogen hydrocarbon, diethyl ether or dichlorodiethyl ether.

The condensation products obtained according to the present process are aminomethylsulfides which are acylated in the amino-group. These products are liquid or solid substances which are decomposed on prolonged boiling with hydrochloric acid with formation of the acid used in the acylation. When using methylolamides of aliphatic carboxylic acids containing at least 12 carbon atoms and mercaptans containing at least one water-solubilizing group, there are obtained products of the formula

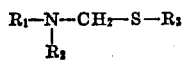

wherein $R_1$ stands for the acyl radical of an aliphatic carboxylic acid containing at least 12 carbon atoms, $R_2$ stands for a member of the group consisting of hydrogen and alkyl radicals, and —S—$R_3$ stands for the radical of a mercaptan which contains at least one water-solubilizing group. When using primary carboxylic acid amides there may be obtained products of the general formula

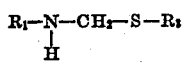

wherein $R_1$ and $R_3$ have the significance indicated in the preceding sentence. Particularly valuable are the products of the above cited formulae in which $R_1$ stands for the acid radical of an aliphatic carboxylic acid containing at least 12 carbon atoms, preferably an even number of carbon atoms between 12 and 20.

The products obtainable by the invention may be used as adjuvants, for instance in the textile, leather and paper industries. The products which are insoluble in water may, by suitable choice of the parent material, become valuable intermediate products for the production of textile adjuvants or of dyestuffs. In many cases the water-insoluble products may be used as waxes.

Owing to their capillary active properties those water-soluble products which contain aliphatic or cycloaliphatic residues of high molecular weight behave as valuable wetting, washing, emulsifying, foaming, levelling and softening agents. By suitable choice of the parent material the water-soluble salts have the property that when they are heated or treated with a saponifying agent they decompose, an insoluble body separating. Should this separation occur on a substratum, for instance a textile fabric, this insoluble body adheres to the substratum. According to its nature it imparts valuable properties to the substratum, for instance fibers. Among these may be mentioned water-proofing or water-repelling properties which are fast to washing and which may be united with a special softness and fullness, which latter effect may be enhanced by addition of a separate filling agent. Furthermore a strong diminution of the hygroscopic character and an increase of the insulating properties with regard to heat and electricity may be obtained. As further properties which may be imparted to the fibre may be named stability to creasing, to the shifting of the woven threads, the diminution of lustre, the increase of stability to water, the prevention of shrinkage of the fabric and in the case of wool prevention of felting. By local application of the process calendering, matting and damask effects are obtained, also color effects due to the varied affinity of the fiber for dyestuffs. When the process is used on colored textiles the properties of the dyeings, for instance fastness to light, rubbing, washing and water may be essentially increased. These varied effects may be inter-connected one with the other.

The products of the process may be used alone or together with other substances, for instance salts, especially salts of weak acids, for instance sodium acetate; also together with solvents, soaps, soapy substances, protective colloids, dressings, loadings, softening agents or matting agents.

The following examples illustrate the invention, the parts being by weight and the parts by weight having the same relationship to parts by volume as the kilo has to the litre.

*Example 1*

A mixture of 10 parts of stearic acid methylolamide, 4.4 parts of thioglycollic acid and 60 parts of glacial acetic acid is heated at 55° C. and the solution which has become almost quite clear is filtered. By cooling there is precipitated the condensation product which probably has the formula

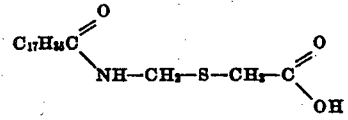

in the form of colorless crystals. The sodium salt of this new condensation product which is obtainable by neutralizing with sodium hydroxide solution is after drying a colorless powder soluble in warm water to a solution which foams when shaken. This sodium salt, especially a mixture of 30 parts of the sodium salt and 13 parts of the disodium salt of the monocarboxylic acid ester made from 4-sulfophthalic acid and the commercial mixture of hexadecyl- and octadecyl-alcohol, is very suitable for softening viscose artificial silk in treating-liquors prepared with soft or hard water.

Example 2

11 parts of lauric acid methylolamide, 7 parts of thioglycollic acid and 100 parts of glacial acetic acid are heated together at 40° C. whereby a clear solution is obtained. On cooling, the condensation product of the following probable formula

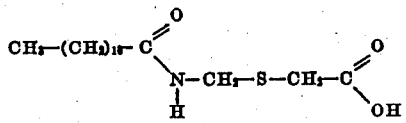

obtained is precipitated in the form of colorless crystals. The sodium salt obtained by neutralizing the sodium hydroxide solution is after drying a colorless powder soluble in water to a clear solution which foams strongly when shaken.

Instead of the lauric acid methylolamide there may also be used the corresponding undecylic acid methylolamide or benzoic acid methylolamide, and instead of the mercaptoacetic acid there may be used the α-mercaptopropionic acid.

Example 3

7.7 parts of lauric acid methylolamide are dissolved in 70 parts by volume of dioxane, 4 parts of glycerine mercaptan are now added and while cooling with ice 7 parts by volume of concentrated sulfuric acid are added drop by drop while stirring. After standing overnight at the ordinary temperature the whole is neutralised cautiously while cooling with caustic soda solution and then evaporated in a vacuum at 50–60° C. to dryness. The mass is extracted with absolute alcohol, the latter is evaporated and the residue washed with a little ether, whereby the new product which corresponds probably to the formula

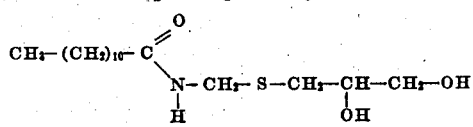

is obtained in the form of a soft substance soluble in water.

Instead of glycerine mercaptan there may also be used mercaptans of the sugar series.

Example 4

7 parts of the N-chloromethyl compound of the N-methylstearic acid amide are dissolved in 10 parts of glacial acetic acid. After addition of 2 parts of thioglycollic acid the clear solution is heated for 30 minutes on the steam bath. After cooling the solution is mixed with petroleum ether, whereupon an oil separates. The latter is again washed with petroleum ether and then freed therefrom in a vacuum. There remains a feebly yellow viscous oil which dissolves in water to a clear solution after addition of sodium carbonate. The aqueous solution foams strongly and decomposes completely on prolonged boiling.

Example 5

1 part of sodium β-mercapto-ethanesulfonate or the corresponding quantity of a preparation containing inorganic salts such as sodium sulfate and sodium chloride is dissolved in 15 parts of water, 1.1 parts of lauric acid-N-methylolamide and 25 parts of glacial acetic acid are added to this solution and the whole is heated at 90–95° for ¾ hour while stirring. It is then filtered to remove any undissolved portions and evaporated to dryness under reduced pressure. The new condensation product remains in the form of a solid colorless mass which dissolves in hot water to a clear solution which foams strongly when shaken, and which corresponds very probably to the formula

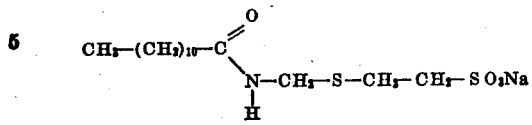

What we claim is:

1. Process for the manufacture of condensation products, which comprises reacting a N-hydroxymethylamide of an aliphatic mono-carboxylic acid containing at least 12 carbon atoms with an aliphatic mercaptan containing at least one water-solubilizing group in the presence of an acid.

2. Process for the manufacture of condensation products, which comprises reacting a N-hydorxymethylamide of an aliphatic mono-carboxylic acid containing at least 12 carbon atoms with an aliphatic mercaptan containing as a water-solubilizing group at least one hydroxy group in the presence of an acid.

3. Process for the manufacture of a condensation product, which comprises reacting the lauric acid N-hydroxymethylamide with glycerine mercaptan in the presence of an acid.

4. Process for the manufacture of condensation products, which comprises reacting a N-hydroxymethylamide of an aliphatic mono-carboxylic acid containing at least 12 carbon atoms with an aliphatic mercaptan containing at least one salt forming group as a water-solubilizing group in the presence of an acid.

5. Process for the manufacture of condensation products, which comprises reacting a N-hydroxymethylamide of an aliphatic mono-carboxylic acid containing at least 12 carbon atoms with an aliphatic mercapto carboxylic acid in the presence of an acid, and neutralizing the condensation product to form an alkali metal salt.

6. Process for the manufacture of a condensation product, which comprises reacting the lauric acid N-hydroxylmethylamide with thioglycollic acid in the presence of an acid, and neutralizing the condensation product to form an alkali metal salt.

7. Process for the manufacture of a condensation product, which comprises reacting the lauric acid N-hydroxymethylamide with a salt of the β-mercapto ethane sulfonic acid in the presence of an acid, and neutralizing the condensation product to form an alkali metal salt.

8. The acylated amino-methyl sulfides of the general formula

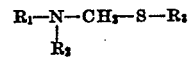

wherein $R_1$ stands for the acyl radical of an aliphatic mono-carboxylic acid containing at least 12 carbon atoms, $R_2$ stands for a member of the group consisting of hydrogen and alkyl radicals, and $-S-R_3$ stands for the radical of an aliphatic mercaptan containing at least one water solubilizing group, which products are water-soluble capillary active liquid to solid substances which are decomposed by prolonged boiling with hydrochloric acid to form water-insoluble compounds.

9. The acylated amino-methyl sulfides of the general formula

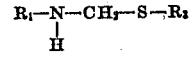

wherein $R_1$ stands for the acyl radical of an aliphatic mono-carboxylic acid containing an even number of carbon atoms between 12–20, and —S—R₃ stands for the radical of an aliphatic mercaptan containing at least one water-solubilizing group, which products are water-soluble capillary active liquid to solid substances which are decomposed by prolonged boiling with hydrochloric acid to form water-insoluble compounds.

10. The acylated amino-methyl sulfides of the general formula

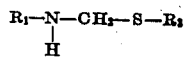

wherein $R_1$ stands for the acyl radical of an aliphatic mono-carboxylic acid containing an even number of carbon atoms between 12–20, and —S—R₃ stands for the radical of an aliphatic mercaptan containing at least two hydroxy groups, which products are water-soluble capillary active liquid to solid substances which are decomposed by prolonged boiling with hydrochloric acid to form water-insoluble compounds.

11. The acylated amino-methyl sulfide of the formula

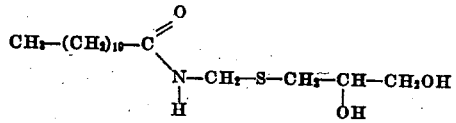

which product is a soft water-soluble capillary active mass which is decomposed by prolonged boiling with hydrochloric acid to form water-insoluble compounds.

12. The acylated amino-methyl sulfides of the general formula

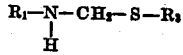

wherein $R_1$ stands for the acyl radical of an aliphatic mono-carboxylic acid containing an even number of carbon atoms between 12–20, and —S—R₃ stands for the radical of an aliphatic mercaptan containing at least one salt forming group as a water-solubilizing group, which products are water-soluble capillary active liquid to solid substances which are decomposed by prolonged boiling with hydrochloric acid to form water-insoluble compounds.

13. The alkali metal salts of acylated amino-methyl sulfides of the general formula

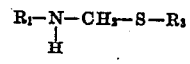

wherein $R_1$ stands for the acyl radical of an aliphatic mono-carboxylic acid containing an even number of carbon atoms between 12–20, and —S—R₃ stands for the radical of an aliphatic mercapto carboxylic acid, which products are water-soluble capillary active liquid to solid substances which are decomposed by prolonged boiling with hydrochloric acid to form water-insoluble compounds.

14. The alkali metal salts of the acylated amino-methyl sulfide of the formula

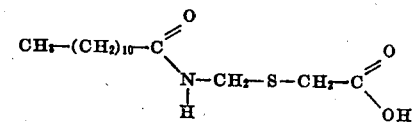

which products are solid water-soluble capillary active substances which are decomposed by prolonged boiling with hydrochloric acid to form water-insoluble compounds.

15. The alkali metal salts of the acylated amino-methyl sulfide of the formula

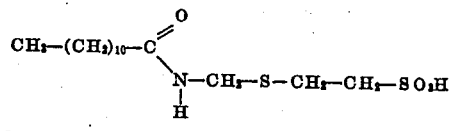

which products are solid water-soluble capillary active substances which are decomposed by prolonged boiling with hydrochloric acid to form water-insoluble compounds.

OTTO ALBRECHT.
RICHARD SALLMANN.